United States Patent [19]

Harakawa et al.

[11] Patent Number: 4,785,380
[45] Date of Patent: Nov. 15, 1988

[54] SOLID ELECTROLYTIC CAPACITOR, AND METHOD OF MANUFACTURING SAME

[75] Inventors: Yoshihiro Harakawa; Koji Izawa; Hidemitsu Takeuchi; Shinji Nakamura; Sadamu Toita, all of Kawasaki, Japan

[73] Assignee: Nitsuko Corporation, Kanagawa, Japan

[21] Appl. No.: 80,858

[22] Filed: Aug. 3, 1987

[30] Foreign Application Priority Data

Jan. 23, 1987 [JP] Japan .................................. 62-12207

[51] Int. Cl.$^4$ .............................................. H01G 9/04
[52] U.S. Cl. ..................... 361/433; 29/570.1
[58] Field of Search ................. 361/433, 5 A, 5 C; 29/570.1

[56] References Cited

U.S. PATENT DOCUMENTS

| | | | |
|---|---|---|---|
| 2,387,759 | 10/1945 | Jarvis | 361/323 X |
| 2,647,079 | 7/1953 | Burnham | 361/433 X |
| 3,375,413 | 3/1968 | Brill | 361/433 |
| 3,553,544 | 1/1971 | Puppolo et al. | 361/433 |
| 3,679,944 | 7/1972 | Yoshimura et al. | 361/433 |
| 3,697,822 | 10/1972 | Alvvitt et al. | 361/433 |
| 3,745,508 | 7/1973 | Bruder et al. | 338/320 |
| 3,781,976 | 1/1974 | Tomiwa | 361/433 X |
| 4,009,424 | 2/1977 | Itoh | 29/570.1 X |
| 4,039,904 | 8/1977 | Klein et al. | 361/433 |
| 4,494,299 | 1/1985 | Franklin et al. | 29/570.1 |

FOREIGN PATENT DOCUMENTS

| | | | |
|---|---|---|---|
| 2305838 | 10/1976 | France . | |
| 76357 | 7/1978 | Japan | 29/570.1 |
| 61-2315 | 1/1986 | Japan . | |

Primary Examiner—Donald A. Griffin
Attorney, Agent, or Firm—Armstrong, Nikaido, Marmelstein & Kubovcik

[57] ABSTRACT

A solid electrolytic capacitor, and a method of manufacturing the same, includes a capacitor element which comprises a metal plate capable of having a dielectric oxidation layer formed thereon, a dielectric oxidation layer formed on a surface of the metal plate, a polymer layer of a heterocyclic compound formed on the dielectric oxidation layer, a conductive layer formed on the polymer layer, wherein the polymer layer near a defect interface of the dielectric oxidation layer is converted into an insulator, and terminals provided on respective ones of the metal plate and conductive layer.

9 Claims, 6 Drawing Sheets

LEAKAGE CURRENT DISTRIBUTION

LEAKAGE CURRENT DISTRIBUTION

LEAKAGE CURRENT—VOLTAGE CHARACTERISTICS

| | STATE OF ELECTROLYTE SOLUTION | FAILURE RATE DUE TO LC |
|---|---|---|
| NO.1 | STIRRED | MORE THAN 20% |
| NO.2 | AT REST | LESS THAN 10% |

SOLID ELECTROLYTIC CAPACITOR, AND METHOD OF MANUFACTURING SAME

BACKGROUND OF THE INVENTION

This invention relates to a solid electrolytic capacitor using an organic semiconductor as an electrolyte. More particularly, the invention relates to a solid electrolytic capacitor in which a polymer of a heterocyclic compound such as pyrrole, furan or thiophene is used as a solid electrolyte, and to a method of manufacturing this capacitor.

Conventionally, solid electrolytic capacitors use manganese dioxide ($MnO_2$) or 7,7,8,8-tetracyanoquinodimethane (TCNQ) salt as a solid electrolyte.

When $MnO_2$ is employed as the solid electrolyte, a layer of $MnO_2$ is formed on an anodic oxide film formed on the body of an anode. Ordinarily, the manufacturing method adopted as a method of forming the $MnO_2$ layer is as follows:

(1) the anodic oxide film formed on the surface of the anode body is impregnated with manganese nitrate;

(2) the $MnO_2$ layer is formed on the anodic oxide film by thermal decomposition;

(3) reformation is carried out; and (4) the aforementioned steps (1) through (3) are repeated three to five times to form the $MnO_2$ layer on the anodic oxide film of the anode body.

When a salt of TCNQ is employed as the solid electrolyte, a layer of TCNQ salt is formed on an anodic oxide film formed on the body of an anode. Ordinarily, the manufacturing method adopted as a method of forming the TCNQ salt layer is as follows: the TCNQ salt is liquified by being melted at 110°–150° C. if the salt is e.g. quinolinium di-(tetracyanoquinodimethane) salt and at 280°–290° C. if the salt is N-n-propylisoquinoline tetracyanoquinodimethane salt, the anode body is impregnated with the molten solution of TCNQ salt, and the result is cooled rapidly to form the layer of TCNQ salt on the anodic oxide film of the anode body.

Both the method of forming the $MnO_2$ layer and that for forming the TCNQ salt layer are disadvantageous in that they involve very complicated and costly manufacturing processes, the specific resistance or ESR of the capacitors is high and there is a large leakage current. Accordingly, in order to improve upon the aforementioned problems relating to these manufacturing processes and capacitor characteristics, a novel solid electrolytic capacitor has been disclosed in which a polymer layer of a heterocyclic compound is used as the solid electrolyte. For example, see the specification of Japanese Patent Application Laid-Open Publication (KOKAI) No. 61-2315.

A solid electrolytic capacitor of this type in which the polymer layer of a heterocyclic compound is used as the solid electrolyte has a capacitor element constructed as follows.

Specifically, a dielectric oxide layer such as aluminum oxide ($Al_2O_3$) is formed on the surface of a metal plate on which the dielectric oxide film or the like is capable of being formed. A polymer layer of a heterocyclic compound is formed on the dielectric oxide layer by electrolytic oxidation polymerization in an electrolyte solution in which a heterocyclic compound such as pyrrole, furan or thiophene has been dissolved. The polymer layer serves as the solid electrolyte. A conductive layer for electrode extraction is formed on the polymer layer, and terminals are attached to the metal plate and conductive layer, thereby fabricating the capacitor element.

However, problems arise even in this conventional solid electrolytic capacitor using the polymer layer of a heterocyclic compound as the solid electrolyte. Specifically, when the polymer layer of the heterocyclic compound is formed on the dielectric oxide layer in the process for manufacturing the capacitor element, the dielectric oxide layer is caused to deteriorate, the ability of the capacitor to withstand voltage declines and the amount of leakage current increases. The reasons are as follows:

Specifically, in the process through which the polymer layer of the heterocyclic compound is formed on the dielectric oxidation layer of the metal plate, the dielectric oxidation layer is deteriorated by the electric current during polymerization, as a result of which the amount of leakage current and dielectric loss increase, differences occur from one manufactured product to another, and yield declines due to a deterioration in insulation. Thus, many problems are encountered in terms of manufacturing uniform products economically. Consequently, the state of the art is such that the above-described solid electrolytic capacitor has yet to be realized as a commericial product and marketed.

SUMMARY OF THE INVENTION

The present invention has been devised in view of the foregoing circumstances and its object is to provide a solid electrolytic capacitor using a polymer layer of a heterocyclic compound as a solid electrolyte in which leakage current is greatly reduced and the capacitor characteristics are markedly improved without increasing equivalent series resistance (ESR), i.e. without increasing dielectric loss ($\tan\delta$).

Another object of the invention is to provide a method of manufacturing the aforementioned solid electrolytic capacitor.

The solid electrolytic capacitor in accordance with the present invention is characterized by having a capacitor element comprising: a metal plate capable of having a dielectric oxidation layer formed thereon; a dielectric oxidation layer formed on a surface of the metal plate; a polymer layer of a heterocyclic compound formed on the dielectric oxidation layer; a conductive layer formed on the polymer layer, wherein the polymer layer near a defect interface of the dielectric oxidation layer is converted into an insulator; and terminals are provided on the metal plate and conductive layer, respectively.

In accordance with the invention, the method of manufacturing a solid electrolytic capacitor is characterized by manufacturing the aforementioned capacitor element by using at least the following means: means for forming a dielectric oxidation layer on a surface of a metal plate capable of having a dielectric oxidation layer formed thereon; means for forming a polymer layer of a heterocyclic compound on the dielectric oxidation layer; means for forming a conductive layer on the polymer layer of the dielectric oxidation layer; means for converting the polymer layer near a defect interface of the dielectric oxidation layer into an insulator; and means for providing terminals on respective ones of the metal plate and conductive layer.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1A:
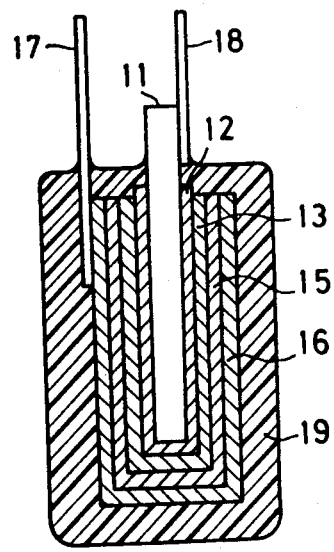
FIG. 1(A) a sectional view illustrating a solid electrolytic capacitor element according to the present invention.
Figure 1B:
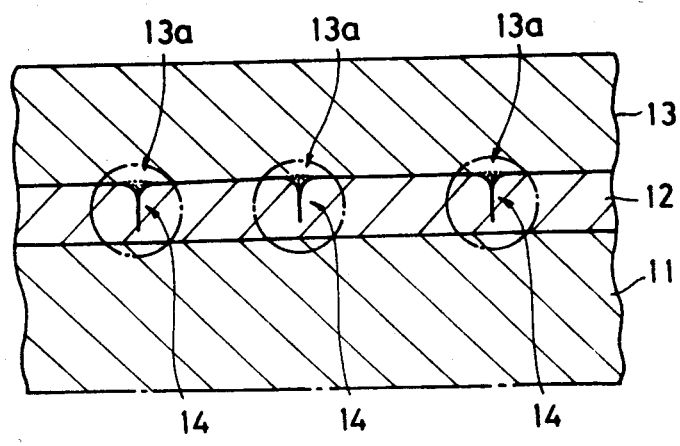
FIG. 1(B) an enlarged sectional view illustrating the interface of a dielectric oxidation layer and a polymer layer of a heterocyclic compound.

FIG. 1(A) is a sectional view illustrating a solid electrolytic capacitor according to the present invention, and FIG. 1(B) is an enlarged sectional view illustrating the interface of a dielectric oxidation layer and a polymer layer of a heterocyclic compound.

The solid electrolytic capacitor of the illustrated embodiment includes an aluminum plate 11 serving as a substrate of a capacitor element and capable of having a dielectric oxidation layer formed thereon, an aluminum oxide ($Al_2O_3$) layer 12 formed as a dielectric oxidation layer on the surface of the alumimum plate 11, a pyrrole polymer layer (polypyrrole layer) 13 formed as a polymer layer of a heterocyclic compound on the surface of the aluminum oxide layer 12, a graphite layer 15 formed as a conductive layer for terminal extraction on the polypyrrole layer 13, and a silver paste layer 16 formed on the graphite layer 15.

Electrode terminals 17, 18 are attached to the silver paste layer 16 and aluminum plate 11, respectively, thereby forming a capacitor element.

An undercoat layer 19 consisting of e.g. a polybutadiene resin is formed on the top surface of the silver paste layer 16.

As will be described in detail below, the polypyrrole layer 13 formed on the aluminum oxide layer 12 is formed by electrolytic oxidation polymerization. In the process for forming the polypyrrole layer 13, the aluminum oxide layer 12 deteriorates at several places due to the current that flows when polymerization is carried out, whereby defects 14 are produced in the aluminum oxide layer 12, as shown in (B) of FIG. 1.

In the solid electrolytic capacitor using the polypyrrole layer 13 as an electrolyte, the defects 14 in the aluminum oxide layer 12 cause an increase in leakage current LC, a variance from one product to another, and a decline in yield due to a deterioration in insulation.

In accordance with the illustrated embodiment, these problems are solved by insulating the vicinity 13a of the defect interface of the polypyrrole layer 13 which has grown to the interface of the defect 14 of the aluminum oxide layer 12. As a result, as will be described in detail later, the leakage current LC can be markedly reduced without bringing about an increase in dielectric loss, a variance from one product to another can be minimized and a decline in yield caused by a deterioration in insulation can be greatly reduced. Thus, a grealy improved capacitor can be obtained.

The method of forming the alumimum oxide layer 12, the polypyrrole layer 13, the graphite layer 15 and the silver paste layer 16, as well as the method of insulating the vicinity 13a of the defect interface of the polypyrrole layer 13 which has grown to the interface of the defects 14 of the aluminum oxide layer 12, will now be described.

First, the surface of the aluminum plate 11 is roughened by an etching treatment, then the aluminum oxide ($Al_2O_3$) layer 12 is formed by a well-known formation process on the roughened surface of the aluminum plate 11. The aluminum oxide layer 12 is formed by using the aluminum plate 11 as an anode and applying a predetermined formation voltage (10 V–50 V) thereto in e.g. an adipic acid-type solution.

Figure 2A:
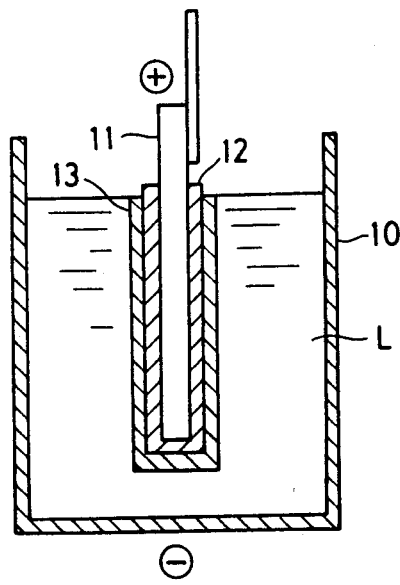
FIG. 2(A) is a view showing a process for forming the polymer layer of a heterocyclic compound.
Figures 8, 9:
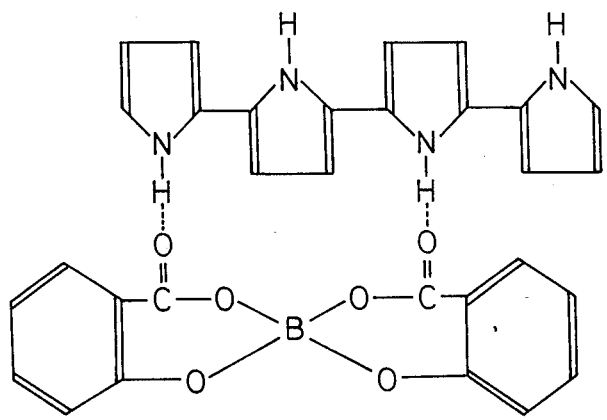
FIG. 8 is a view of experimental results indicating the failure rate, caused by leakage current, of a solid electrolytic capacitor manufactured upon changing the state of an electrolyte solution in the apparatus of FIG. 7.
FIG. 9 is a view showing the chemical structure of polypyrrole.

Next, as shown in (A) of FIG. 2, the polypyrrole layer 13 is formed by preparing an electrolyte solution L which includes pyyrole and ammonium borodisalicylate (ABS) and which employs acetonitrile or acetone as the solvent, pouring the electrolyte solution L in a stainless steel vessel 10, dipping the aluminum plate 11 having the aluminum oxide layer 12 formed on its surface into the electrolyte solution L, and supplying a predetermined direct current using the stainless steel vessel 10 as a cathode and the aluminum plate 11 as an anode. As a result, electrolytic oxidation polymerization takes place in the electrolyte solution so that a polypyrrole layer having the chemical structure shown in FIG. 9 is formed on the aluminum oxide layer 12. The thickness of the polypyrrole layer is 20–50 μm.

Since the polymer layer of pyrrole that is to say polypyrrole layer formed by electrolytic oxidation polymerization on the dielectric oxidation layer such as the aluminum oxide layer 12 is a polypyrrole compound in which the N-H radical of the pyrrole molecules and the supporting electrolyte are hydrogen bonded, the electrolytic oxidation polymerization should be carried out in an electrolyte solution which includes pyrrole and the supporting electrolyte. Use should be made of a supporting electrolyte containing boric acid and any one of the following ingredients:

(1) an aliphatic acid, aromatic carboxylic acid or salt thereof;

(2) an aliphatic or aromatic compound, or salt thereof, having two or more carbonyl radicals;

(3) an aliphatic or aromatic compound, or salt thereof, having at least one hydroxyl (—OH) radical and at least one carboxylic acid (—COOH) radical; and (4) an aliphatic or aromatic compound, or salt thereof, having at least one amine (—NH$_2$) radical and at least one carboxylic acid (—COOH) radical.

It is of course possible to use a boron compound obtained by chemically combining boric acid and the abovementioned (1) through (4) as the supporting electrolyte.

To form the graphite layer 15 and silver paste layer 16 on the pyrrole polymer layer 13, first the aluminum plate 11 having the polymer layer 13 thereon is dipped into a graphite solution, after which the graphite on the layer 13 is allowed to harden to form the graphite layer 15. The resulting structure is then dipped into a silver paste solution to coat the graphite layer 15 with the silver paste. This is then allowed to harden to form the silver paste layer 16.

Figure 2B:
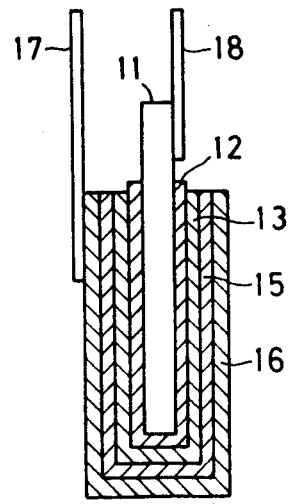
FIG. 2(B) sectional view illustrating the capacitor element before the formation of an undercoat layer.

The result of the foregoing steps is the capacitor element having the cross sectional structure shown in FIG. 2(B).

When the polypyrrole layer 13 is formed on the aluminum oxide layer 12 by electrolytic oxidation polymerization as set forth above, the defect 14 is produced in the aluminum oxide layer 12, as shown in (B) of FIG. 1. This increases the leakage current of the solid electrolytic capacitor. Therefore, a characterizing feature of the present embodiment is to insulate the region 13a of the polypyrrole layer 13 near the defect interface where the region has grown into the interface of the defect 14.

As seen from the entirety of the polypyrrole layer 13, the region 13a of the polypyrrole layer 13 near the defect is extremely small. Therefore, even if the region 13a is insulated, the leakage current LC can be markely reduced without increasing the dielectric loss (tan δ) of the capacitor, as is indicated by experimental results described later.

One example of insulating the region 13a of polypyrrole layer 13 which has grown in the interface of the defect 14 of the aluminum oxide layer 12 will now be described.

The solid electrolytic capacitor element having the cross sectional structure shown in (A) of FIG. 1 is dipped in pure water (for 4 hr at a water temperature of about 80° C. in the present example) to impregnate the aluminum oxide layer 12 through the polybutadiene resin undercoat layer 19, the silver paste layer 16, the graphite layer 15 and the pyrrole polymer layer 13. Since the undercoat layer 19, silver paste layer 16 and graphite layer 15 are comparatively water permeable, the water passes through these layers and reaches the aluminum oxide layer 12.

Thereafter, the solid electrolytic capacitor element is extracted from the water and aging is performed at room temperature by applying a voltage which is 1.2 to 2.0 times higher than the rated voltage of the capacitor using the terminal 18 as an anode and the terminal 17 as a cathode, by way of example.

Subjecting the capacitor element to adsorptive permeation of pure water and aging in the above manner insulates the region 13a of the polypyrrole layer 13 near the defect interface where the region has grown into the interface of the defect 14.

Figure 3A:
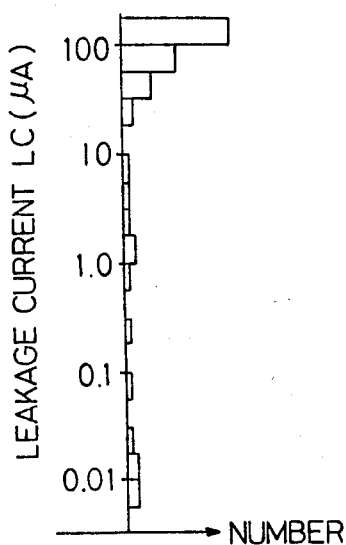
FIG. 3(A) is a view illustrating the distribution of leakage current of the solid electrolytic capacitor before being subjected to an aging treatment.
Figure 3B:
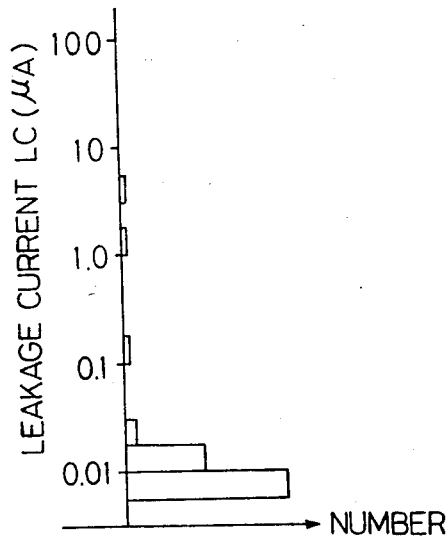
FIG. 3(B) is a view illustrating the distribution of leakage current of the solid electrolytic capacitor after being subjected to an aging treatment.

FIG. 3(A) is a view illustrating the distribution of leakage current LC of the solid electrolytic capacitor before the above-described aging treatment, and FIG. 3(B) is a view illustrating the distribution of leakage current LC of the solid electrolytic capacitor after the above-described aging treatment. As shown in FIGS. 3(A) and 3(B), the leakage current LC of the capacitor element before aging centers on 100 μA or more. When the element is subjected to aging, however, the leakage current LC centers on about 0.01 μA. Thus, it is experimentally verified that carrying out the aging treatment results in a great improvement in terms of leakage current LC.

It should be noted that almost no change in the dielectric loss (tan δ) of the capacitor is observed irrespective of whether the capacitor element is aged or not.

From the fact that an improvement in leakage current LC is achieved without increasing dielectric loss by subjecting the capacitor element to adsorptive permeation and aging, it can be surmised that the leakage current LC is markedly reduced by insulating the polypyrrole layer 13a at the interface of the defect 14 of the aluminum oxide layer 12, which defect is the chief cause of the leakage current LC.

Upon considering the reasons why insulation is achieved by the foregoing aging treatment, it is believd that the following phenomenon occurs within the capacitor element.

Specifically, it is believed that the aging treatment causes an oxidation reaction or a reaction accompanied by an exchange of protons between the polypyrrole molecules of the polypyrrole layer 13 and the water (H$_2$O) molecules permeating the interior of the capacitor element and adsorbed thereon, and that as a result of this reaction, a portion of the pyrrole polymer layer 13, especially the polypyrrole 13a which has grown in the defect 14 of the aluminum oxide layer 12, changes from a semiconductor to an insulator.

In particular, the end of the polypyrrole layer region 13a which has grown into the interface of the defect 14 of aluminum oxide layer 12 defines an acute angle. It is believed that current collects in this region and causes the generation of heat, as a result of which the aforementioned reaction readily occurs.

After the above-described aging treatment, the water content permeating the capacitor element is removed. To accomplish this, the element is subjected to a drying treatment while the rated voltage is applied thereto in a high-temperature atmosphere (about 120° C.) This completes the fabrication of the solid electrolytic capacitor element. If necessary, a resin molded cladding can be applied to the undercoat layer 19 to complete the fabrication of the solid electrolytic capacitor of the invention.

Figure 4:
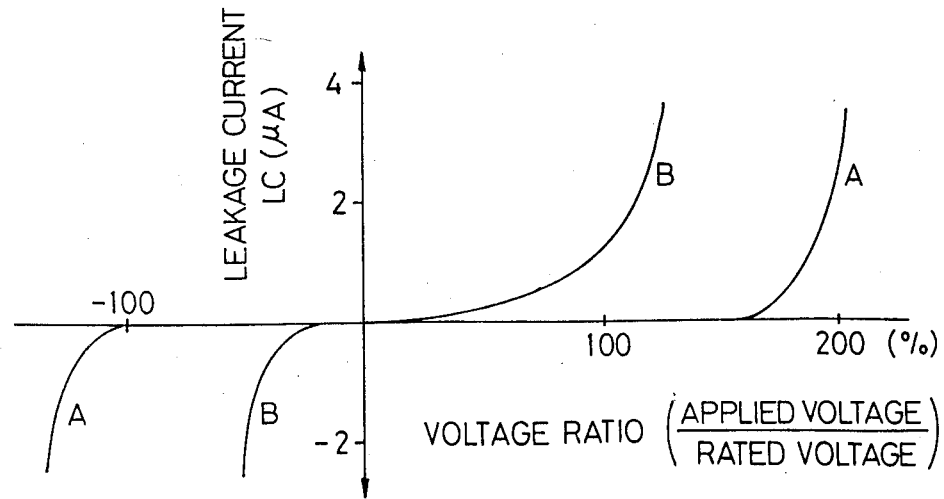
FIG. 4 is a view showing leakage current - voltage characteristics before and after the aforementioned aging treatment.

FIG. 4 is a view showing leakage current - voltage characteristics before and after the aforementioned aging treatment. Voltage ratio, namely the ratio (%) of applied voltage to rated voltage, is plotted along the horizontal axis, and the leakage current LC (μA) is plotted along the vertical axis. Curve A indicates the change in leakage current after the aging treatment, and curve B indicates the change in leakage current before the aging treatment. The positive (+) side is for a case where voltage is applied using the terminal 18 as the anode and the terminal 17 as the cathode. The negative side is for a case where voltage is applied using the terminal 17 as the anode and the terminal 18 as the athode.

It will be readily understood from FIG. 4 that voltage may be applied to the solid electrolytic capacitor within the rated voltage range without taking polarity into consideration. In other words, it is possible to use the capacitor irrespective of polarity. The reason for this is the aging treatment, namely the insulation of the region 13a of pyrrole polymer layer 13 near the defect interface of defect 14 of the aluminum oxide layer 12.

Figure 5:
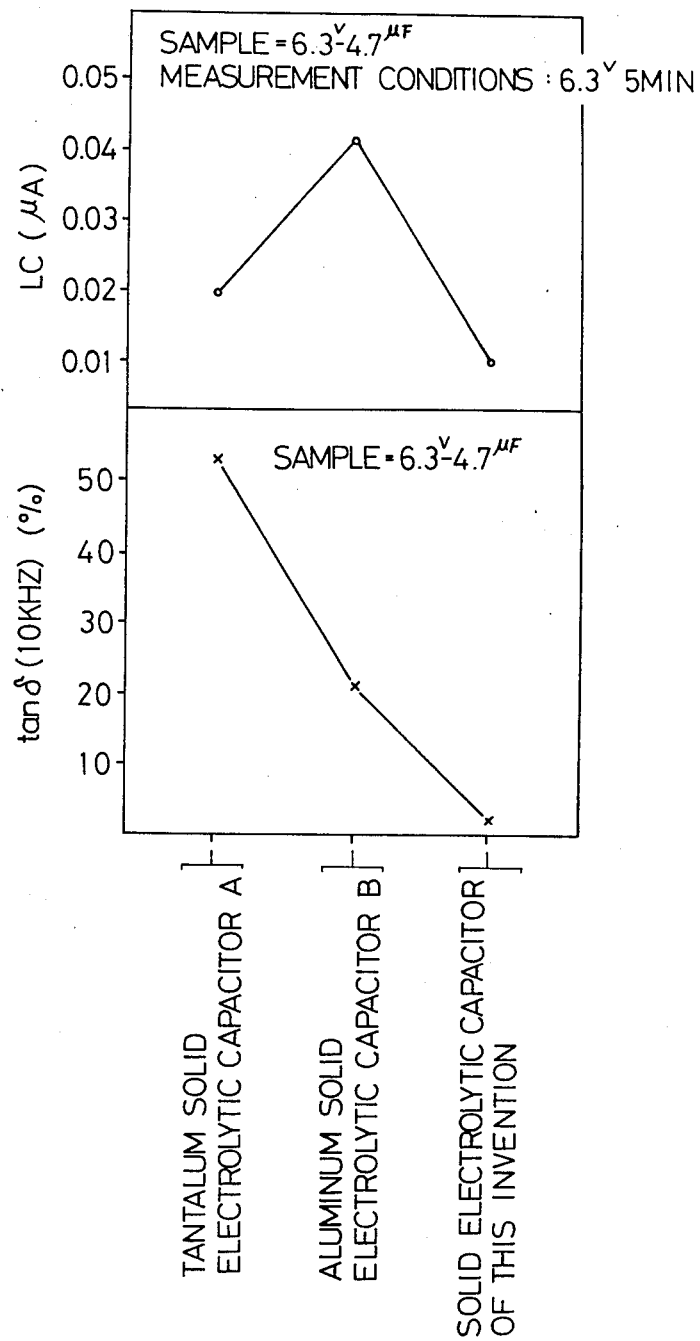
FIG. 5 is a view showing the results of experiments regarding leakage current and dielectric loss for the solid electrolytic capacitor of the invention, a conventional tantalum solid electrolytic capacitor and a conventional aluminum solid electrolytic capacitor.

FIG. 5 is a view showing the results of experiments regarding leakage current and dielectric loss for a solid electrolytic capacitor C perfected by the aforementioned aging treatment according to the invention, a conventional tantalum solid electrolytic capacitor A and a conventional aluminum solid electrolytic capacitor B.

The upper half of FIG. 5 illustrates the experimental results regarding leakage current LC. The results are based on experimental capacitors having a rated voltage of 6.3 V and a capacitance of 4.7 $\mu F$. It is shown that the solid electrolytic capacitor C of the invention has a leakage current of about 0.01 $\mu A$, which is very low in comparison with the conventional tantalum solid electrolytic capacitor A (0.02 $\mu A$) and conventional aluminum solid electrolytic capacitor B (0.42 $\mu A$).

The lower half of FIG. 5 illustrates the experimental results regarding dielectric loss (tan $\delta$) at 10 KHz. The results are based on experimental capacitors having the aforementioned rated voltage of 6.3 V and a capacitance of 4.7 $\mu F$. It is shown that the solid electrolytic capacitor C of the invention has a dielectric loss (tan $\delta$) of about 3%, which is very low in comparison with the conventional tantalum solid electrolytic capacitor A (about 52%) and conventional aluminum solid electrolytic capacitor B (about 21%).

It is evident from the experimental results shown in FIG. 5 that the solid electrolytic capacitor of the present invention has a low leakage current and little dielectric loss (tan $\delta$) and exhibits excellent capacitor characteristics in comparison with the conventonal solid electrolytic capacitors.

In the above-described embodiment, the resin undercoat layer 19 is applied to the capacitor element. The purpose of this layer is to prevent the moisture impregnating the capacitor element from vanishing during the aging treatment. The means for preventing this loss of the moisture impregnating the element is not limited to the undercoat layer 19. In other words, any means will suffice so long as the the capacitor element can maintain the adsorbed water or at least the solution containing the water during the aging treatment.

An effective method of insulating the region 13a of the polypyrrole layer 13 near the defect interface of the aluminum oxide layer 12 entails subjecting the capacitor element to permeation and adsorption of water or a solution containing at least water and applying a predetermined DC voltage or AC voltage across the terminals 17, 18. However, it is obvious that other means for effecting the abovementioned insulation can be adopted.

Further, in the above-described embodiment, the aluminum plate 11 is used as the metal plate constituting the substrate of the capacitor element. However, it goes without saying that as long as the metal is capable of having the dielectric oxidation layer formed thereon, a tantalum plate, niobium plate or titanium plate can be used.

Also, a pyrrole polymer layer, namely a polypyrrole layer, is adopted as the polymer layer of a heterocyclic compound in the foregoing embodiment. However, the heterocyclic compound is not limited to pyrrole, for furan or thiophene can be used. Polymer layers of these heterocyclic compounds can be formed on the dielectric oxidation layer by electrolytic oxidation polymerization in a solution containing these heterocyclic compounds, and the polymer layers of these heterocyclic compounds near the defect interface of the aluminum oxide layer can be changed from a semiconductor to an insulator.

In accordance with the present invention as described hereinabove, the polymer layer of the heterocyclic compound near the defect interface of the dielectric oxidation layer is converted into an insulator, thereby providing a solid electrolytic capacitor using a polymer layer of a heterocyclic compound as an electrolyte which, in comparison with the conventional solid electrolytic capacitor using a polymer layer of a heterocyclic compound, has a markedly reduced capacitor leakage current without an increased equivalent series resistance (ESR), namely without an increased capacitor dielectric loss (tan $\delta$).

Further, if the leakage current and dielectric loss are reduced and voltage is within a fixed range, there can be provided a solid electrolytic capacitor having excellent capacitor characteristics not achievable with the conventional solid electrolytic capacitor, namely so-called non-polar characteristics in which the leakage current - voltage characteristics are substantially the same regardless of which terminals of the capacitor are used as the anode and cathode.

The polymer layer of the heterocyclic compound, e.g. the aforementioned polypyrrole layer, is formed by electrolytic oxidation polymerization. Though the layer can easily be formed on a precious metal such as gold or platinum by electrolytic oxidation polymerization, formation is unsatisfactory in a case where aluminum, tantalum, niobium or tantalum having the dielectric oxidation layer formed thereon is used as an anode. The reasons, though unclear, are presumed to be as follows.

Specifically, the electrolytic oxidation polymerization takes place through the intermediary of the dielectric oxidation layer formed on the anode. However, the oxidation reaction of the anode surface occurs at the same time as the polymerization reaction. In the polymerization reaction considered to be the result of the two abovementioned competing reactions, when the polymer has a low molecular weight, the polymer does not stop near the surface of the anode but has a tendency to diffuse into the electrolyte solution.

Figure 6:
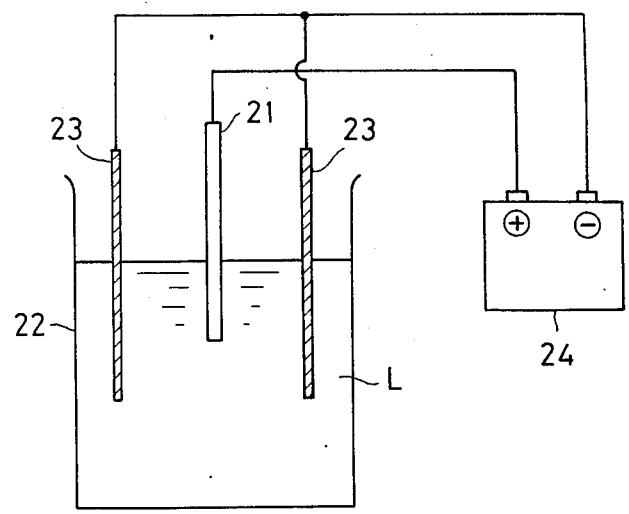
FIG. 6 is a view illustrating the general construction of an apparatus for forming a polymer layer of a heterocyclic compound.

FIG. 6 is a view illustrating a process for forming the polymer layer of the heterocyclic compound. The apparatus includes an electrolytic bath 22 accommodating the electrolyte solution L. The electrolyte solution L is prepared by dissolving 0.05 mol (3.0 g) pyrrole and, as the supporting electrolyte, about 0.02 mol (6.0 g) ammonium borodisalicylate (ABS) in 1 l acetonitrile or acetone as the solvent. A pair of stainless steel plates 23, 23 are immersed in the electrolyte solution L inside the electrolytic bath 22, as well as an aluminum substrate 21 interposed between the stainless steel plates 23, 23. The aluminum substrate 21 is obtained by forming an aluminum oxide layer on an aluminum plate. The anode of a DC power supply 24 is connected directly to the aluminum substrate 21, and the cathode of the DC power supply 24 is connected to both of the stainless steel plates 23, 23.

During the process for forming the polypyrrole layer, the electrolyte solution L in the electrolytic bath 22 is held at a low temperature (e.g. $-40°$ C.). Under these conditions, a current of a predetermined value (e.g. about 10 mA/cm$^2$) is passed continuously across the aluminum substrate 21 and each of the stainless steel plates 23, 23 for 10 min to give rise to electrolytic oxidation polymerization, thereby forming the polypyrrole layer on the aluminum oxide of the aluminum substrate 21. After the polypyrrole layer is formed by electrolytic oxidation polymerization, the surface of the aluminum substrate 21 coated with the polypyrrole layer is washed with pure water.

Next, under certain circumstances, reformation is carried out in order to repair the defects produced by the aforementioned electrolytic oxidation polymerization in the aluminum oxide layer formed on the surface of the aluminum substrate 21. In such case, reformation is carried out at a voltage which is ¾ of the formation voltage used to initially form the aluminum oxide layer on the aluminum substrate 21, and at a solution temperature of not more than 50° C.

A procedure exactly the same as the foregoing is employed to from the graphite layer 15 and silver paste layer 16 on the aluminum substrate 21 having the polypyrrole layer formed thereon.

It was verified that the polypyrrole layer could be formed on the surface of the anodic aluminum substrate 21 in good order by maintaining the electrolyte solution at a low temperature. The reason for this is surmised to be that the molecular motion of the monomer and oligomer on the anode surface is slowed down so that these stop near the surface of the anode without being diffused into the solution, as a result of which the formation of the polypyrrole layer takes place satisfactorily. In addition, the reaction of the aluminum is suppressed by the low temperature.

It is described in the foregoing embodiment that the electrolyte solution is held at a temperature of $-40°$ C. However, it was confirmed that a polypyrrole layer having good characteristics will be formed on the aluminum substrate 21 if the aforementioned electrolytic oxidation polymerization is carried out at a temperature of less than $-25°$ C. Formation of a uniform polypyrrole layer is impeded by a high temperature of $-25°$ C. or more.

Further, it is described in the foregoing embodiment that a polypyrrole layer, namely a pyrrole polymer layer, is formed as the polymer layer of the heterocyclic compound. However, the polymer layer may consist of a polymer of another heterocyclic compound, such as furan or thiophene. Such a polymer layer can be formed satisfactorily as set forth above if the electrolyte solution in which the heterocyclic compound is dissolved is held at the aforementioned low temperatures and electrolytic oxidation polymerization is carried out in the electrolyte solution.

It was experimentally verified that forming the polymer layer of the heterocyclic compound as described above will result in an excellent polymer layer if the electrolytic oxidation polymerization is carried out at the low temperature of $-25°$ C. or less. Since heat is generated by the electrolytic oxidation polymerization reaction, a large quantity of heat is evolved when a large number of anodes are electrolyzed in the same electrolytic bath by mass production. As a result, the temperature of the electrolyte solution at the upper part of the electrolytic bath will differ from that at the lower part of the bath. Accordingly, it is required that the electrolyte solution be stirred to make the temperature distribution uniform.

Described next will be an example of a method in which the polymer layer of the heterocyclic compound is formed while the electrolyte solution in the electrolytic bath is held at a uniform temperature.

Figure 7:
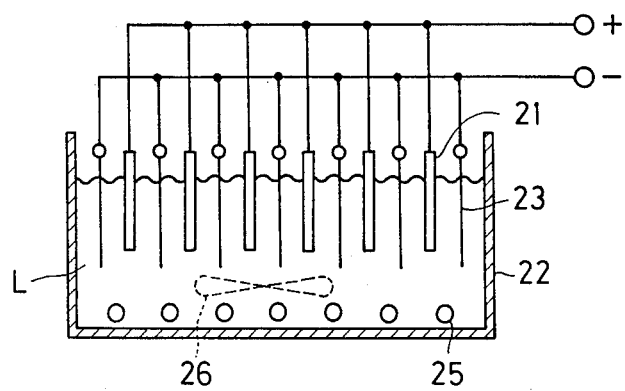
FIG. 7 is a view illustrating the general construction of another apparatus for forming a polymer layer of a heterocyclic compound.

FIG. 7 is a view illustrating a process for forming a polymer layer of a heterocyclic compound while an electrolyte solution is held at a uniform, low temperature. As shown in FIG. 7, a plurality of stainless steel plates 23, 23 . . . are arranged in the electrolytic bath 22. A cooling pipe 25 through which a coolant is passed and a fan 26 for stirring the electrolyte solution are disposed at the bottom of the bath 22.

The electrolytic bath 22 accommodates the electrolyte solution L. As described above, the electrolyte solution L is prepared by dissolving 0.05 mol (3.0 g) pyrrole and, as the supporting electrolyte, about 0.02 mol (6.0 g) ammonium borodisalicylate (ABS) in 1 l acetonitrile or acetone as the solvent. The electrolyte solution L in the electrolytic bath 22 is cooled and held at a temperature of $-43°$ C., and the aluminum substrate 21 having the aluminum oxide layer formed on its surface is set between each pair of the stainless steels plates 23. The stainless steel plates 23, 23, . . . are connected to the negative electrode terminal of a DC power supply (not shown), and the aluminum substrates 21 are connected to the positive electrode terminal of the power supply. A current is passed across the stainless steel plates 23 and aluminum substrates 21 to perform electrolytic oxidation polymerization, thereby forming the polypyrrole layer on the aluminum oxide layer of the aluminum substrate 21.

Though the electrolyte solution L is held at the predetermined low temperature (e.g. $-43°$ C.) in the above-described process for forming the polypyrrole layer, the fan 26 is rotated periodically in order to hold the temperature distribution of the electrolyte solution L uniform in the electrolytic bath 22.

In order to determine what the optimum conditions for electrolytic oxidation polymerization are, polypyrrole layers were formed by starting electrolysis while the electrolyte solution L was being stirred and while the electrolyte solution L was at rest, and the results were investigated. FIG. 8 is a view showing the results of measuring the leakage current LC of a capacitor element having the polypyrrole layer formed as described above.

The capacitor element used to obtain the results shown in FIG. 8 had the polypyrrole layer 13 formed on the surface of the aluminum substrate 21 through the above-described method. As shown in FIG. 2, the graphite layer 15 and silver paste layer 16 were formed successively on the polypyrrole layer 13, the terminal 17 was attached to the silver paste layer 16, and the terminal 18 was attached to the aluminum substrate 21. A voltage of 6.3 V was impressed across the terminals 17, 18 and a capacitor element that exhibited a leakage current of more than 0.3 $\mu$A was taken as being defective. A sample of 50 of these capacitor elements was fabricated under each condition, and the failure rate due to leakage current was expressed in terms of a percentage.

The aluminum substrates 21 of the samples were set in the electrolytic bath 22 while the fan 26 was rotating, a direct current was applied and electrolytic oxidation polymerization was initiated (No. 1). The failure rate was 20%.

Next, the aluminum substrates 21 of the samples were set in the bath 22 when the electrolyte solution was at rest, that is, after the fan 26 was stopped and the electrolyte solution came to rest, and electrolytic oxidation polymerization was then carried out (No. 2). When the fan 26 was stopped, the electrolyte solution L came to rest comparatively quickly since there were a plurality of the stainless steel plates 23 in the electrolytic bath 22 and these acted as barrier walls.

The results of measurement shown in FIG. 8 indicate a high LC failure rate when the electrolyte solution L is stirred. The reason for this is that stirring the solution L disturbs the growth of the polymer for electrolytic oxidation polymerization.

It is described in the foregoing embodiment that the electrolyte solution is held at a low temperature of $-43°$ C. However, it was confirmed that a polypyrrole layer having good characteristics will be formed on the aluminum substrate 21 if the aforementioned electrolytic oxidation polymerization is carried out at a temperature of less than $-25°$ C. Formation of a uniform polypyrrole layer is impeded by a high temperature of $-25°$ C. or more.

Further, it is described in the foregoing embodiment that a polypyrrole layer, namely a pyrrole polymer layer, is formed as the polymer layer of the heterocyclic compound. However, the polymer layer may consist of a polymer of another heterocyclic compound, such as furan or thiophene. In such case it will suffice to hold the electrolyte solution in which the heterocyclic compound is dissolved at the aforementioned low temperature and carry out electrolytic oxidation polymerization in the electrolyte solution. In the process for forming the polymer layer shown in FIGS. 6 and 7, the capacitor element has the polypyrrole layer 13 formed on the surface of the aluminum substrate 21. As shown in FIG. 1(A), the graphite layer 15 and silver paste layer 16 are formed successively on the polypyrrole layer 13, the terminal 17 is attached to the silver paste layer 16, and the terminal 18 is attached to the aluminum substrate 21. Thereafter the undercoat layer 19 is formed on the surface of the silver paste layer 16 to complete the capacitor element.

The capacitor element is dipped in pure water to impregnate the aluminum oxide layer 12 through the polybutadiene resin undercoat layer 19, the silver paste layer 16, the graphite layer 15 and the pyrrole polymer layer 13. Aging is performed at room temperature by applying a voltage which is 1.2 to 2.0 times higher than the rated voltage of the capacitor using the terminal 18 as an anode and the terminal 17 as a cathode, by way of example. As a result, a solid electrolytic capacitor having the capacitor characteristics shown in FIGS. 3 through 5 is obtained.

As many apparently widely different embodiments of the present invention can be made without departing from the spirit and scope thereof, it is to be understood that the invention is not limited to the specific embodiments thereof except as defined in the appended claims.

What we claim is:

1. A solid electrolytic capacitor having a capacitor element comprising:
   a metal plate capable of having a dielectric oxidation layer formed thereon;
   a dielectric oxidation layer formed on a surface of said metal plate;
   a conductive polymer layer formed on said dielectric oxidation layer which is a polymer layer of a heterocyclic compound selected from the group consisting of pyrrole, furan and thiopene formed by electrochemical polymerization in an electrolyte solution containing said heterocyclic compound and supporting electrolyte which either comprises boric acid and any one of the following organic compounds:
   (1) an aliphatic or aromatic carboxylic acid, or a salt thereof;
   (2) an aliphatic or aromatic compound having two or more carbonyl radicals, or a salt thereof;
   (3) an aliphatic or aromatic compound having at least one hydroxyl radical and at least one carboxylic radical, or a salt thereof; and
   (4) an aliphatic or aromatic compound having at least one amine radical and at least one carboxylic radical, or a salt thereof; or comprises a boron compound obtained by chemically combining boric acid and any of the compounds (1) to (4);
   a conductive layer formed on said conductive polymer layer, wherein said conductive polymer layer near a defect interface of said dielectric oxidation layer is converted into an insulator; and
   terminals provided on each of said plate and conductive layer.

2. The solid electrolytic capacitor according to claim 1, wherein said metal plate is a member selected from the group consisting of an aluminum plate, a tantalum plate, a niobium plate and a titanium plate.

3. The solid electrolytic capacitor according to claim 1, wherein said polymer layer is a polymer layer of heterocyclic compounds obtained by chemically combining heterocyclic compound and a boron compound.

4. The solid electrolytic capacitor according to claim 3, wherein said boron compound is obtained by chemically combining boric acid and an aliphatic or aromatic carboxylic acid or a salt thereof.

5. The solid electrolytic capacitor according to claim 3, wherein said boron compound is obtained by chemically combining boric acid and an aliphatic or aromatic compound, having two or more carbonyl radicals or a salt thereof.

6. The solid electrolytic capacitor according to claim 3, wherein said boron compound is obtained by chemically combining boric acid and an aliphatic or aromatic compound, having at least one hydroxyl radical and at least one carboxylic acid radical respectively, or a salt thereof.

7. The solid electrolytic capacitor according to claim 3, wherein said boron compound is obtained by chemically combining boric acid and an aliphatic or aromatic compound, having at least one amine radical and at least one carboxylic acid radical, or a salt thereof.

8. The solid electrolytic capacitor according to claim 1 or 4, wherein said polymer layer comprises a polypyrrole layer formed by electrolytic oxidation polymerization in an electrolytic solution which includes at least pyrrole.

9. The solid electrolytic capacitor according to claim 1, wherein said conductive layer comprises a graphite layer and a silver paste layer.

* * * * *

UNITED STATES PATENT AND TRADEMARK OFFICE
CERTIFICATE OF CORRECTION

PATENT NO. : 4,785,380

DATED : November 15, 1988

INVENTOR(S) : HARAKAWA et al

It is certified that error appears in the above-identified patent and that said Letters Patent is hereby corrected as shown below:

Column 12, lines 56 and 57, "claim 1 or 4" should read
--claim 1 or 3--.

Signed and Sealed this

Thirtieth Day of April, 1991

Attest:

HARRY F. MANBECK, JR.

Attesting Officer

Commissioner of Patents and Trademarks